Nov. 22, 1949     R. J. HERBOLD     2,489,219
APPARATUS INCLUDING AN ALTIMETER FOR AIDING
THE LANDING OF AIRCRAFT
Filed Dec. 28, 1944     5 Sheets-Sheet 1
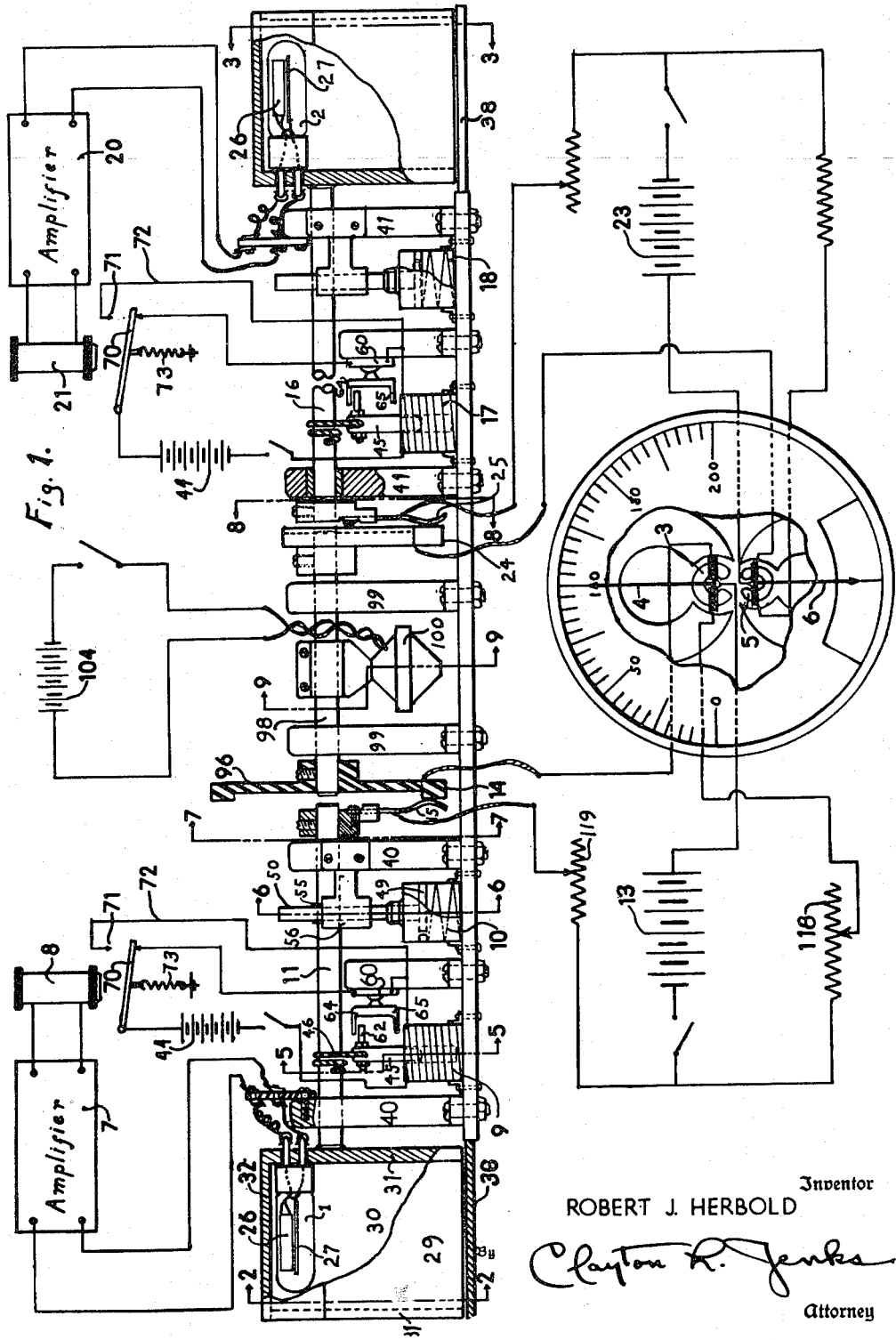
Inventor
ROBERT J. HERBOLD
Clayton R. Jenks
Attorney

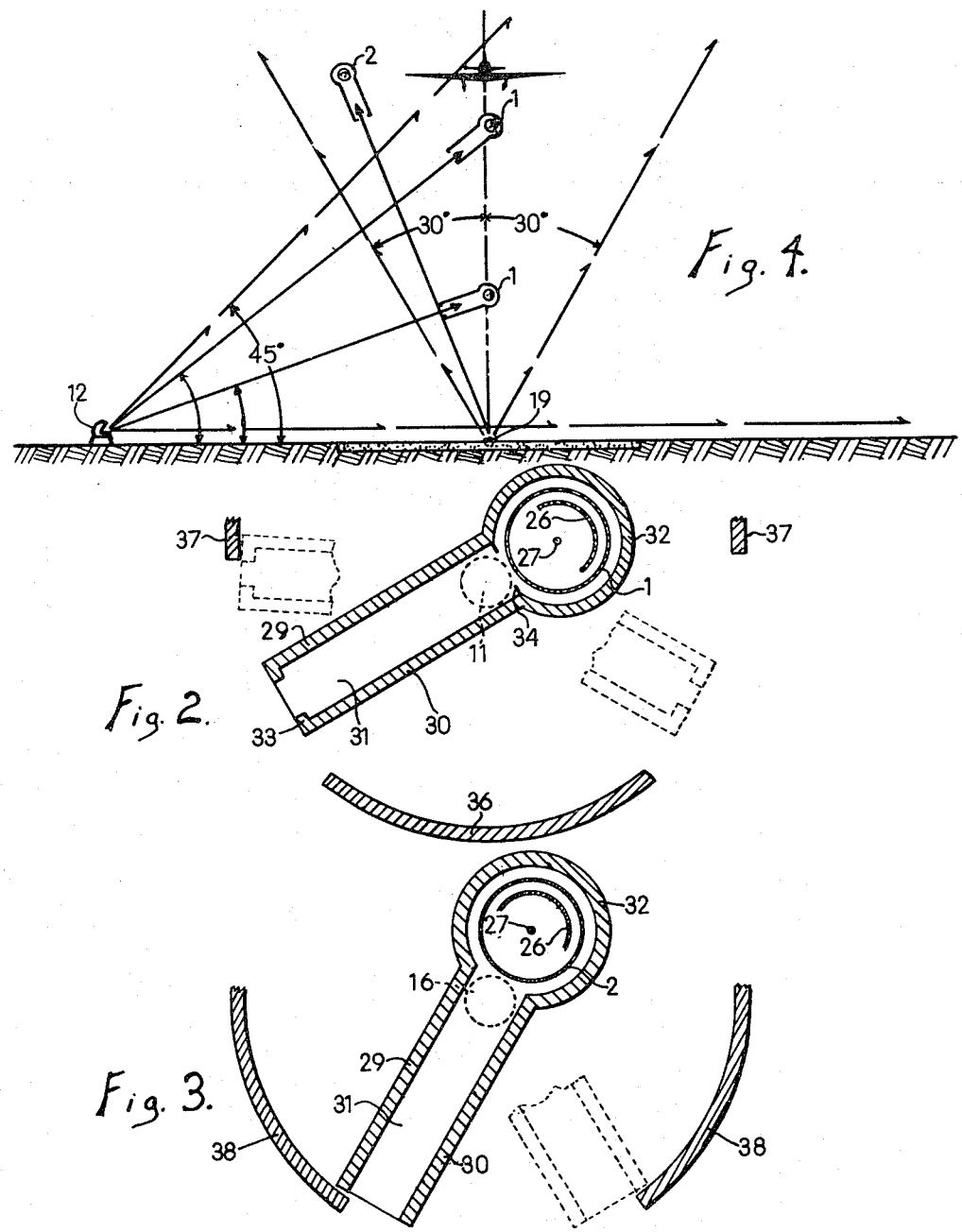

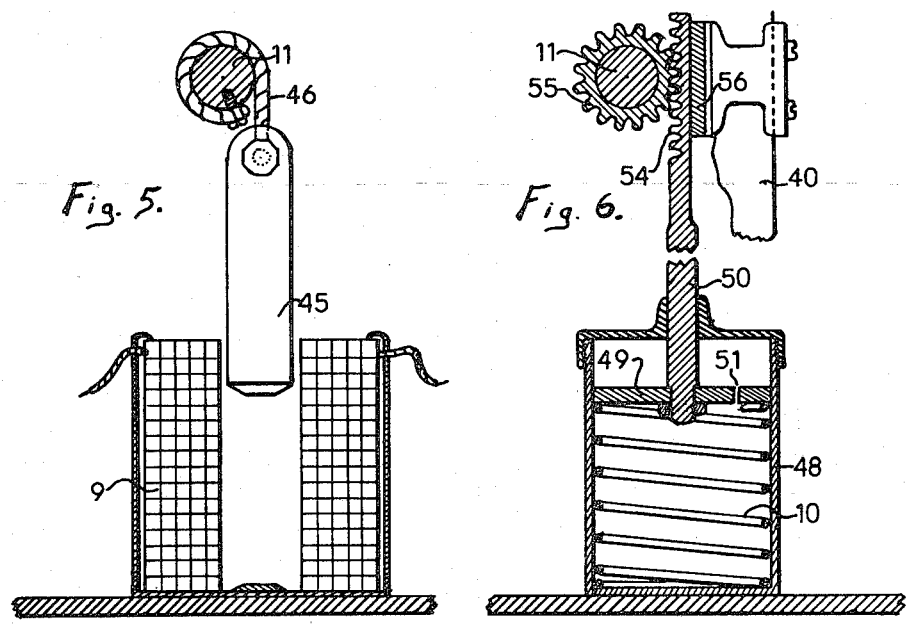
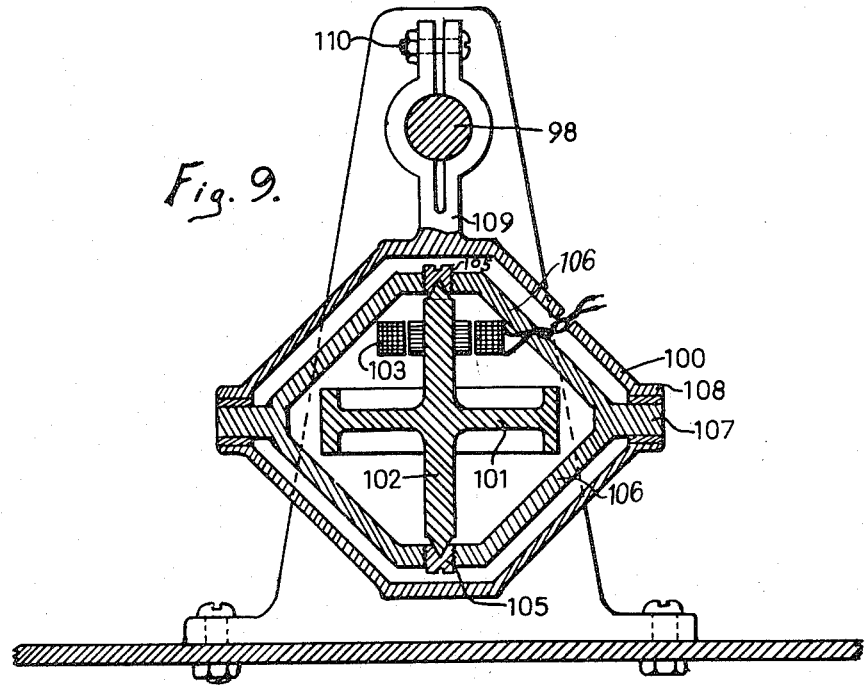

Inventor
ROBERT J. HERBOLD

Nov. 22, 1949 R. J. HERBOLD 2,489,219
APPARATUS INCLUDING AN ALTIMETER FOR AIDING
THE LANDING OF AIRCRAFT
Filed Dec. 28, 1944 5 Sheets-Sheet 5
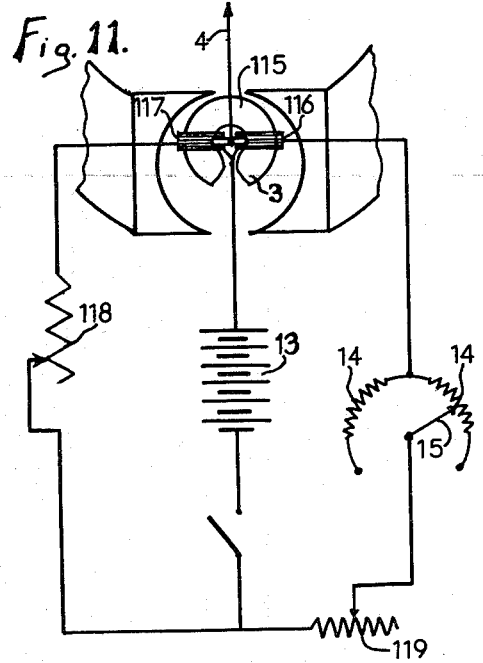
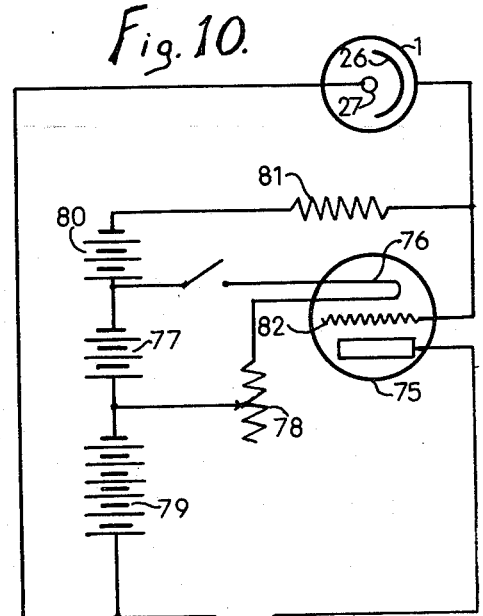
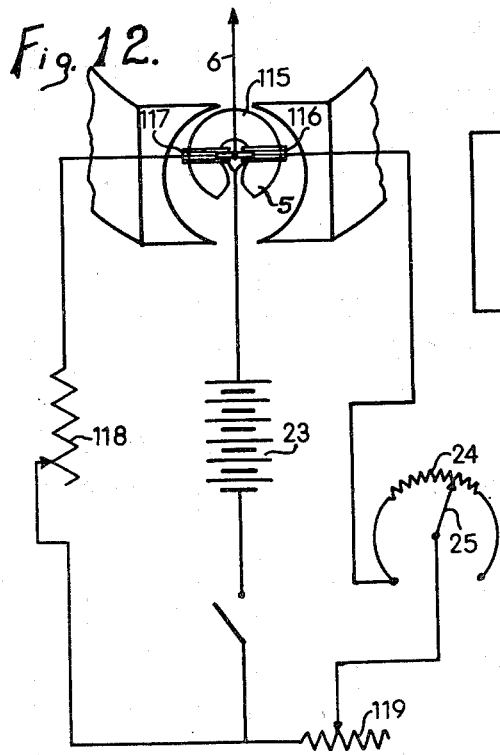
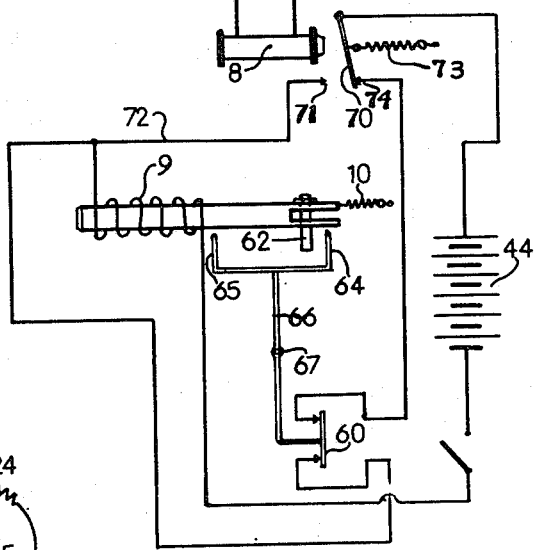
Inventor
ROBERT J. HERBOLD
By Clayton R. Jenks
Attorney Patented Nov. 22, 1949

2,489,219

UNITED STATES PATENT OFFICE 2,489,219

APPARATUS, INCLUDING AN ALTIMETER FOR AIDING THE LANDING OF AIRCRAFT

Robert J. Herbold, Denver, Colo., assignor to Lafayette M. Hughes, Denver, Colo.

Application December 28, 1944, Serial No. 570,169

12 Claims. (Cl. 33—46)

This invention relates to an instrument landing apparatus for aircraft, and more particularly to apparatus which guides the craft into alignment with the airport runway and insures a safe landing thereon under adverse weather conditions.

In accordance with my landing system, as set forth in my prior patent application, Serial No. 562,353, filed November 7, 1944, a row of altimeter lights is arranged at a known distance from and parallel with the center line of the runway so that by triangulation the altitude of the craft may be determined. Another light source is so arranged at the airport as to insure alignment of the descending craft with that runway. For determining the position of the aircraft relative to the two light sources, a photo eye on the aircraft is directed angularly towards each set of lights and its angular position is translated as a measurement of altitude or an indication of alignment with the runway, so that the aircraft may make a blind landing safely, even though the pilot cannot see the airport runway.

In the preferred construction of my prior application, a single phototube serves to pick up both sets of lights and the electrical impulses thus developed serve to actuate the two instruments alternately as the tube sweeps across the two lights in succession. An object of the present invention is to have the two instruments separately controlled by independent phototubes in non-related electrical circuits.

Another object is to provide a construction, wherein each phototube picks up the related light beam and then in a succession of short arc oscillations, it follows the apparent light movement and causes its associated indicating needle, or other controlled device, to make a substantially steady movement that is directly related to the angularity of the phototube.

Another object is to provide a construction wherein the oscillation of the light tube, as it makes and breaks optical contact with the light source, is not transmitted to cause oscillation of the controlled instrument and a lost motion mechanism insures that the instrument is held steady and gives a true indication as desired.

Another object is to compensate gyroscopically for variations in angularity of the aircraft by holding essential parts of the mechanism stationary so that the controlled mechanism will not be affected materially.

Another object is to provide simple constructions for indicating the alignment of the aircraft with the runway and its altitude thereover, wherein a photosensitive element is mechanically oscillated over a given field until it picks up a light beam from the airport, after which the photo element controls its own movement and governs the aircraft guidance apparatus.

Another object is to provide a mechanism which causes the photo element to pick up a light beam and thereafter substantially ride the edge of the beam and control the guidance apparatus in accordance with its angularity when activated.

Another object is to provide such an arrangement of two rows of lights at the airport and two phototubes on the aircraft that one tube is activated only by the lights of one row and the other tube only by the other row, whereby altimeter and alignment governing instruments may be each separately controlled by its own associated tube.

In accordance with this invention, two phototubes, or other light sensitive elements, are arranged for separately controlling the indicating devices or other governed aircraft guidance apparatus. One tube is for determining the altitude and the other for ascertaining the alignment with the runway. These instruments, which may be volt meters, ammeters or other suitable devices adapted for guidance or control of the aircraft, are controlled by a variation of some electrical characteristic in the circuit governed or actuated by the photosensitive element; and the measurement of that instrument is proportional to or otherwise related to the variation in the angular position of the photo element when it is activated by one of the light sources.

Referring to the drawings which illustrate a preferred embodiment of this invention:

Fig. 1 is a longitudinal and vertical elevation, with parts broken away, showing mechanical features of the mechanism and including a diagram of various electrical circuits controlling the indicating meters;

Fig. 2 is a fragmentary section on the line 2—2 of Fig. 1 showing the altimeter photo tube and associated light shields;

Figure 7:
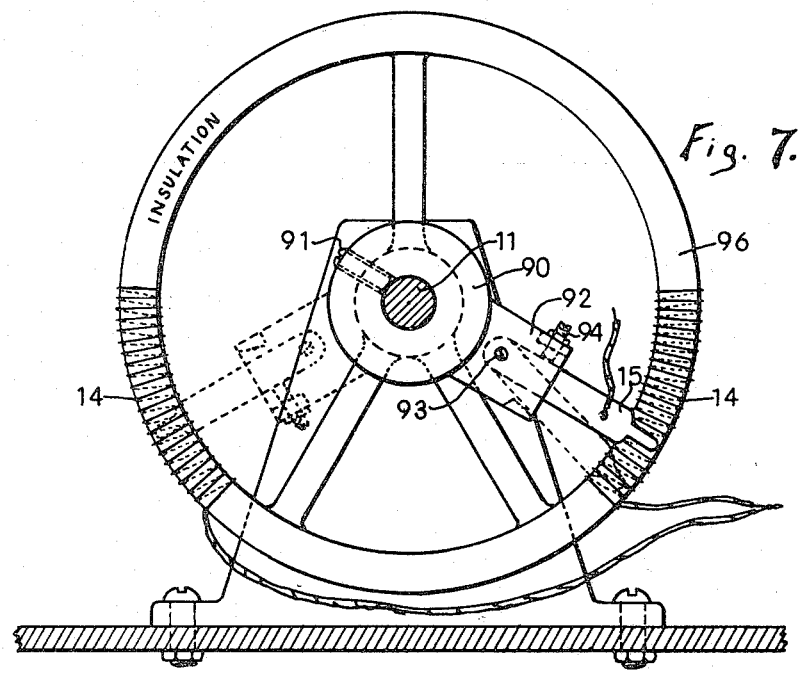
Figure 8:
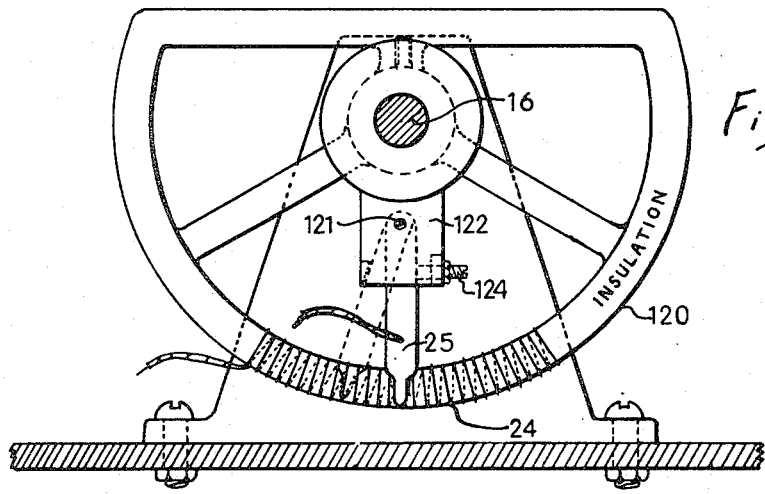

Fig. 3 is a fragmentary section on the line 3—3 of Fig. 1 showing the alignment photo tube and its associated shields;

Fig. 4 is a diagrammatic sketch showing the operative relationships of the two phototubes with their respective light sources;

Fig. 5 is a section on the line 5—5 of Fig. 1 showing the electromagnet which rocks the phototube rock shaft in one direction;

Fig. 6 is a section on the line 6—6 of Fig. 1 showing the dash pot and a compression spring arranged to complete the oscillation of the rock shaft;

Fig. 7 is a section on the line 7—7 of Fig. 1 showing the resistances which control the altimeter measurement;

Fig. 8 is a section on the line 8—8 of Fig. 1 showing the resistance which controls the alignment indicator;

Fig. 9 is a section on the line 9—9 of Fig. 1 showing the gyroscopic mount for the resistances of Figs. 7 and 8;

Fig. 10 is a wiring diagram of the electrical circuits which cause the oscillation of each phototube;

Fig. 11 is a wiring diagram of the resistance controlled altimeter circuit; and

Fig. 12 is a wiring diagram of the alignment meter circuit.

In the construction illustrated particularly in Fig. 1, the photosensitive element 1, at the left hand end of the device, is arranged to determine the altitude of the aircraft by its control of a suitable instrument, such as a ratiometer 3 having its needle 4 arranged to sweep over a scale representing distance above the ground. The other photosensitive element 2, at the right hand end of Fig. 1, controls the ratiometer 5 mounted in the same indicating instrument casing, and its pointer 6 is arranged to point towards the center line of the runway of the airport. The two phototubes are in separate electrical circuits and they are independently mounted for movement into and out of a directive position where light is picked up from the associated light source from the airport. When the photo element 1 is activated by light, an amplifier relay circuit, comprising the amplifier 7 and relay switch 8, serves to set into operation an electromagnet or solenoid 9 (Figs. 1 and 5) and an associated compression spring 10 (Figs. 1 and 6) which oscillate a rock shaft 11 carrying the photosensitive tube through a very small angle into and out of a position where it is activated by a beam from the associated light source 12 (Fig. 4). The solenoid breaks the optical contact with the light beam and the spring restores it, so that the tube thus oscillates through a short arc as it picks up and loses the light alternately.

The balanced ratiometer circuit which controls the altimeter or altitude indicating instrument 3 comprises a battery 13 and variable resistances 14 (Figs. 1 and 11) and a movable contact arm 15 is arranged to vary the resistance and thus cause a variation in the instrument reading. One of these members, the resistance 14 or the contact arm 15, is mounted in a stationary position, while the other is arranged to be moved in the same angular relationship as is the phototube. As illustrated, the resistance is held substantially stationary by a gyroscopic device and the contact arm 15 is moved in angular relationship with the phototube 1 by being fixedly mounted on the same rock shaft 11. Hence, at the instant of activation of the oscillating phototube 1, the instrument circuit will give a reading which is related to the instantaneous angular position of its photosensitive tube.

Similarly, the other photosensitive tube 2 is mounted on an independent rock shaft 16 and oscillated through a small angle by means of an electromagnet 17 and a compression spring 18. When the phototube 2 picks up its associated light source 19 (Fig. 4) it is activated and causes, by means of the circuit of an amplifier 20 and a relay 21, the solenoid 17 to move the phototube 2 away from a position where it picks up the light beam, whereupon breaking of the phototube amplifier relay circuit causes the spring 18 to turn the tube again to a pick-up position. The meter 5 (Figs. 1 and 12) is controlled by a circuit including the battery 23 and a relatively movable resistance 24 and a contact arm 25; and one of these relatively movable parts, such as the contact arm 25, is rocked by the rock shaft 16 in the same angular directiveness as the tube 2, so that it varies the current in the alignment meter circuit and thus cause the needle 6 to move in accordance with the angularity of the photo eye.

Thus, as indicated in Fig. 4, when the aircraft descends from a high altitude in alignment with the landing strip, the phototube 1 will pick up a light beam from source 12, which may be shielded, if desired, to direct its rays within a fixed arc, such as 45°, from a horizontal plane, and the activated phototube will change in its directive angle from 45° relative to a horizontal line when it is first activated to a zero angle when the plane reaches the ground. If the light source 12 is 200 feet from the runway center line, then the plane will be at the altitude of 200 feet when the phototube angle is 45°; and the instrument will be calibrated to give a correct altitude reading for each angle measurement as the plane descends. Since the instrument needle 4 should point to zero when the phototube is horizontally disposed, the altimeter light source 12 should be located at the same elevation as the phototube when the aircraft rests on the ground. Similarly, the light source 19 is preferably arranged in the vertical plane of the runway center line, and it is preferably shielded to throw rays only within a definite angle, such as 30°, on each side of a vertical plane. Hence, the alignment tube 2 will pick up this light only when pointing within that angle; and its associated instrument needle 6 is arranged to point always towards that light 19 and thus guide the pilot or the aircraft into alignment with the runway. The lights 12 and 19 may comprise electric lights, such as infrared bulbs, suitably spaced, to form lines of light parallel with or extending in the same direction as the runway center line. These lines of light may extend along the runway and for a required distance beyond each end of the runway, herein termed the effective distance of runway approach, so as to guide the aircraft as it approaches the airport. Each phototube is suitably carried on a bottom portion of the aircraft, and it is arranged to oscillate about a substantially horizontal axis transversely relative to the direction of travel so as to pick up light on either side. Hence, only a single row of lights 12 is required for the altitude measurement.

Referring to Figs. 1, 2 and 3, each phototube, which may be of standard construction, comprises an arcuate shaped cathode 26 and a wire anode 27. Each tube is mounted at the bottom of an open-ended light well formed by two parallel walls 29 and 30 (Figs. 2 and 3) as well as rear and front walls 31 arranged as a hollow casing that is rectangular in cross section. The light well is sufficiently narrow so that a light beam can reach the cathode only when it passes lengthwise through a comparatively long and narrow passageway. A cylindrical wall portion 32 formed continuous with the walls 29, 30 and 31 provides an enclosure within which the photosensitive tube is removably mounted. The sensitive face of the cathode faces toward the open end of the light well. If desired, further partitions 33 and 34 (Fig. 2) may be so placed in the light well as to narrow the light beam and to direct it toward the central portion of the cathode. The light well is long in the direction of travel of the plane so that the photosensitive tube can pick up lights which are spaced some distance apart; but beam of the light affecting the light sensitive element is unidirectional, in that the light ray is narrow vertically and so makes a definite vertical angle at the point of reception by the element.

The rear wall 31 of the light well carrying the phototube 1 is secured to shaft 11 (Fig. 1), and the other phototube 2 and its associated light well is carried on a shaft 16. The phototube 1 is intended to pick up light rays which range within a 45° angle, or other suitable angle from a horizontal plane, on either side of the airplane. Hence, the phototube and its associated light well are provided with a housing (Fig. 2) comprising a lower wall 36 which subtends an angle of 45° at each side of a vertical plane passing through the axis of its supporting rock shaft 11. Two openings subtending an angle of 45° are provided between the edges of the wall 36 and the walls 37 at opposite sides of the phototube. These walls shut out all light rays on each side of the aircraft except those which lie between a horizontal plane and one at 45° therebeneath, as shown. The phototube 2 is intended to pick up only those light rays which relate to alignment of the craft with the runway; and it is preferred that this phototube be so shielded (Fig. 3) by two side walls 38 that the phototube cathode can be activated only by light entering between these two walls and which are spaced apart by a suitable angle, such as 30° on each side of a vertical plane passing through the axis of the rock shaft 16. These various shields of the two housings are therefore so arranged that phototube 1 cannot be activated by the shielded alignment lights 19, nor can phototube 2 be activated by the shielded altimeter lights 12.

Referring now to Figs. 1, 5 and 6, the two rock shafts 11 and 16 are respectively mounted in two pairs of bearing supports 40 and 41 carried in the airplane structure. Each of these shafts is oscillated by a similar construction, shown particularly in Figs. 5 and 6 which relate to the shaft 11. That is, the electromagnet 9 is energized by a battery 44 (Fig. 1) or other suitable source of power to draw down on the soft iron core 45. This iron core is connected to rock the shaft 11, as by means of a flexible cable 46 wrapped around the shaft and suitably secured at its ends to both the shaft and the core. Thus the solenoid 9 moves the phototube 1 in one direction. The tube is returned in the opposite direction by means of a compression spring 10 (Fig. 6) mounted within the dash pot casing 48. This spring rests on the bottom of the casing and its upper end contacts with the lower side of a plunger piston 49 carried on a piston rod 50. A hole 51 through the piston serves to permit the passage of air at a slow rate, so that this piston serves as a dash pot to prevent a too rapid movement of the phototube in either direction and thus give it a substantially uniform rate of movement under the propulsion of the magnet and spring. The upper end of the piston rod 50 has rack bar teeth 54 meshing with a pinion 55 fixed on the rock shaft 11. A suitable slide way 56 carried by the airplane structure holds the rack bar in mesh with the pinion. Thus, as soon as the electric circuit is broken by the phototube losing optical contact with the light beam, the spring 10 returns the phototube 1 to its initial light operative position; whereupon it is again moved away from the light by the solenoid 9.

Since the aircraft position relative to the airport may not be fully determined by the customary radio beam, I prefer to have each photosensitive element initially hunting back and forth across its associated field of light, so that it will pick up the light when the plane gets within the angle of the light beam projection. To effect this wide angle oscillation of the light tube, in which it swings across the entire 180° for the altimeter pickup or the 60° angle for the alignment tube, it is required that this wide angle oscillation be effected without any aid from the photosensitive element. In the construction illustrated, the battery 44 makes a circuit with the coil of the solenoid 9 when the walking beam switch 60 is closed. At that time, the amplifier relay is inoperative and positioned as shown in Figs. 1 and 10. The soft iron core 45 of the solenoid carries a projecting pin 62 (Fig. 1) which oscillates between two arms 64 and 65 of a yoke which actuates the walking beam switch. This switch, which may be of any suitable construction, is diagrammatically illustrated in Fig. 10 as comprising a lever 66 pivoted at 67 on a suitable support. When the solenoid core is drawn inwardly, the pin 62 ultimately strikes the lower arm 65 of the yoke member and rocks the switch member 60 out of contact with the associated contact point of the battery circuit, thus stopping the oscillation of the photo arm in one direction. Thereupon, the dash pot spring 10 pulls the magnet core upwardly again until it strikes the other arm 64 of the yoke and thus again closes the switch. The angle of oscillation is determined therefore by the distance between the two yoke arms and these may be adjusted to give at least 180° movement for tube 1 and at least 60° for tube 2, or as desired. Thus, the shaft carrying the photo eye will oscillate steadily back and forth through a wide angle and at a desired rate as determined by the dash pot. This goes on until the light sensitive cathode of the phototube is activated by a light ray. Thereafter, the phototube controls the oscillation through the amplifier relay circuit. The construction and the operation of the parts arranged for rocking the phototube 2 are the same as described relative to tube 1, as indicated by the same reference numerals applied to the parts associated with the solenoid 17 and the dash pot spring 18.

The phototube control, after the airport line of light has been picked up, is accomplished by the amplifier relay circuit shown in Figs. 1 and 10. Each of the phototubes is connected with a battery or other source of power, such as a generator or transformer, and the electrical impulses set up by the cathode when the tube is activated may be used to move the relay switch arm 70 and make another circuit through the contact 71 and associated wiring 72. When the solenoid 8 is inoperative, a spring 73 holds the switch arm 70 (Fig. 10) against the contact 74. When the relay solenoid 8 is energized, this completes a circuit through contact 71 with the battery 44 and the solenoid 9 for actuation of the rock shaft 11, or solenoid 17 for shaft 16, by the associated solenoid when the phototube is activated. This causes the phototube to rock away from alignment with the light source. Thereupon, the photo tube relay circuit is de-energized and the controlled battery circuit is immediately broken by spring 73 at the relay contact 71, and the dash pot spring 10 then pulls the rock shaft back quickly to bring the phototube again into alignment with the light source. The phototube is so sensitive that the rock shaft can move only through a very slight angle, so that the phototube rides the edge of the light beam, as it were, in that the phototube is activated as soon as it picks up the light. The shaft thus oscillates through too short an arc to cause contact of pin 62 with the yoke arms 64 and 65. Under extremely heavy weather conditions in which the passage of light is materially hindered, the phototube may travel slightly further to secure a greater electron emission from the cathode.

The phototube amplifier circuit may be made as desired by one skilled in the art. In Fig. 10, I have illustrated a triode gas filled or vacuum tube 75 in which there is a directly heated cathode filament 76 connected with a battery 77 through a resistance 78. In the forward circuit employed, the main battery 79 and a grid bias battery 80 are connected as illustrated. The grid bias battery is also connected through a resistance 81 with the grid plate 82 of the triode tube; and this battery is intended to bias that plate with the required negative potential so that when the cathode 26 of the associated photo tube is activated by light, an electrical current will pass through the amplifier tube and thus serve to actuate the relay. It will be appreciated that instead of battery circuits, I may use an alternating current transformer with associated condensers and other apparatus and that the power circuits of Figs. 11 and 12 may be suitably modified depending upon the type of apparatus which is controlled.

The indicating meter, or other instrument controlled by the phototube, which is to triangulate the directive angle of the tube is connected in a separate circuit. The altimeter circuit for photo tube 1 is shown in Fig. 11 and the alignment beam circuit controlled by photo tube 2 is shown in Fig. 12. Referring first to the altimeter circuit of the apparatus of Figs. 1, 7, and 11, the construction is such that the meter needle 4 indicates a variation in amperage, or of voltage if desired, as occasioned by varying the position of contact arm 15 relative to the two resistances 14 arranged as shown in Figs. 7 and 11. The contact arm 15 (Fig. 7) is mounted on a sleeve 90 secured to the rock shaft 11 by a set screw 91. To provide for lost motion movement of the sleeve relative to the arm, the sleeve 90 is provided with a bifurcated lug 92 and the inner end of the contact arm 15 is pivotally mounted therein on a pin 93. The slot is of such shape and arrangement that the contact arm 15 may remain stationary while the shaft moves to an angular extent determined by a take-up set screw 94 adjustably carried on the lug 42. This adjustment permits the rock shaft 11 to oscillate freely without moving the arm 15 while it travels through the short arc involved in moving the phototube into and out of alignment with the light source of the airport. That is, the lost motion is such that the arm 15 is not disturbed or moved over the associated resistance except as is needed to indicate a different altitude. The position of the arm is determined by the end position of the rock shaft as it oscillates in one direction. When the shaft and tube move in the opposite direction, the arm 15 remains stationary, and it is moved only as the phototube assumes a new angularity in its activation by the light beam. The direction of the activated phototube approaches a horizontal line as the aircraft descends and thus the shaft 11 gradually moves the contact arm 15 towards a horizontal position. The phototube will hunt to both sides of the aircraft originally by swinging through an arc of about 180°; but the instant that the tube picks up the light on either side of the craft, it remains near that pick-up position and the contact arm 15 will contact with that one of the wire coils 14 on the left or the right hand side of the structure of Fig. 7 depending on the direction towards which the tube is pointing.

The two resistances 14 are exposed coils of suitable fine wire with the turns insulated from each other but closely spaced. The coils are wrapped around an insulating ring 96 (Fig. 7) which is supported on a rock shaft 98 (Fig. 1) suitably mounted on bearing supports 99. The resistance 14 is held stationary as the aircraft tilts by means of a gyroscopic device which holds essential parts immovable relative to the horizon.

The preferred construction, shown in Fig. 9, comprises a heavy gyroscopic wheel 101 fixed to the vertical shaft 102 and rotated by a suitable electric motor 103 driven from a desired source of power, such as the battery 104 illustrated in Fig. 1. The shaft 102 has cone bearings mounted in adjustable set screws 105 at its opposite ends, and these set screws are carried in a gimbal frame 106 having horizontal trunnions 107 pivotally carried in suitable bearings in the outer frame 108. This outer frame 108 is secured to and depends from an arm 109 clamped to the shaft 98 by a bolt 110 passing through the split arms of a clamping yoke on the end of the arm 109. Thus the gyroscopic wheel 101 keeps the shaft 98 in a fixed position irrespective of any lateral tilting of the aircraft, and the insulating ring 96 which carries the resistances 14 is therefore held stationary relative to the horizon. The shafts 11, 98 and 16 are arranged longitudinally of the aircraft or axially in the direction of flight, so that the phototubes may sweep from side to side of the aircraft as the craft approaches the airport. No compensation need be made for pitching or a changing inclination of the angle of flight of the craft since the phototubes will not be materially affected thereby. The two resistances 14 (Fig. 11) subtend the same angles as the openings between the walls 36 and 37 (Fig. 2) so that the contact arm may sweep from a 45° angle to a horizontal position while controlling its associated instrument needle 4.

The indicating instrument in Fig. 11 is a ratiometer of standard construction comprising a magnet 115 and two coils 116 and 117 which control the movement of the needle 4. The two coils are connected in common to the battery 13, the coil 116 being connected to the variable resistances 14 as shown and the other to an adjustable resistance 118. A further variable resistance 119 may be included in the circuit with the resistance 14. The instrument is of the type wherein any unbalance in the circuit will cause the meter to register.

The alignment instrument, whose circuit is shown in Fig. 12, is controlled by phototube 2. This comprises substantially the same arrangement as shown in Fig. 11, except that there is only a single resistance 24 mounted as a coil of exposed fine wire wrapped around an insulating segment 120 (Fig. 8) arranged as an arc subtending the same 60° angle as is provided between the light shields 38 of Fig. 3. The contact arm 25 is mounted the same as is the contact arm 15 illustrated in Fig. 7, in that it is pivotally supported on a pin 121 in a slot in the lug 122 carried by shaft 16. A take-up set screw 124 limits the swinging movement of the shaft 16 which is permitted before the arm 25 is moved. That is, the solenoid 17 (Fig. 1) rocks the phototube 2 and the contact arm 25 to the right (Fig. 8) and the dashpot spring 18 moves the parts to the left. The lost motion for the arm 25 permits the photo tube to swing through a small angle without changing the resistance. Since the resistance 24 is also held stationary relative to the horizon because of its being carried by the gyroscopic shaft 98 and its supports 99 (Fig. 1), then any lateral tilting of the aircraft will not affect the measurements relating to alignment.

It is feasible to have these variable resistances 14 and 24 govern the operation of various types of controlled or guidance apparatus, such as the indicating instruments illustrated in Figs. 1, 11 and 12. These instruments are suitably calibrated and each electrical circuit is so arranged and regulated that the altitude indicating needle 4 will lie at zero when the aircraft is on the ground. This condition may be fulfilled when all of the associated resistance 14 is cut into the circuit of Fig. 11. The alignment indicating needle 6 has its circuit and operating parts so constructed and controlled that the needle will always point toward the light source. Hence, the needle points downwardly in a vertical position when the aircraft is properly aligned with the center of the runway. This condition prevails when the contact arm 25 is vertical or has cut in one half of the resistance 24.

For the source of light waves employed at the airport, I may use electromagnetic waves between 2,000 and 20,000 Angstrom units. I prefer to employ either standard electric light bulbs or a series of "Westinghouse" radiant heat drying lamps of at least 250 watts power. This lamp gives a high infrared radiation and so will penetrate fog, clouds, dust, snow, sleet, rain, or other atmospheric storm conditions and activate the landing instrument within distances of 1,000 feet or more. The beams from the alignment light sources 19 should reach at least 1,000 feet altitude so that the pilot will be fully informed of his position before he gets close to the ground. He will be guided by the standard radio beams until he gets near the airport. The altimeter light source 12 will not be needed until the plane is within a few hundred feet of the ground for the average local terrain, unless there are serious obstructions within the vicinity of the airport.

For the light sensitive element, I prefer to use a photoelectric element which is electron emissive, such as a standard electric eye phototube; but I may use a photoelectric conductive element, such as a selenium cell, or a photoelectric voltaic element, such as a copper oxide cell. A satisfactory electron emissive tube comprises an arcuate shaped cathode of silver coated with caesium oxide and an anode of wire mounted at the axis of the cathode arc. These are sealed in a glass casing filled with a low pressure gas or provided with a vacuum and the casing is adapted to conduct the required light waves or has an infrared transmitting window therefor. Light waves, and particularly the infrared, cause the emission of electrons from the light sensitive cathode surface which result in the passage to the anode of an electric current derived from a suitable source, such as a battery. I may use a "General Electric" argon gas filled photo tube PJ23, which is most sensitive to wave lengths between about 3,000 and 12,000 Angstrom units and is particularly useful for waves above 7,000 Angstroms. The tube and battery circuit is, of course, selected to give ample current for actuating the relay under all required distances and atmospheric conditions.

The amplifier tube is likewise of suitable standard construction and its circuit will depend on the nature of the tube, whether triode, tetrode, pentode or other type; and multiple stage amplification may be employed, if desired. The triode of the drawings has a directly heated filament wire cathode, an anode plate and a grid therebetween, such as a "General Electric" 12 battery type or a 45 transformer type amplifier tube.

It will be appreciated that the description of the types of tubes and the circuits has been simplified for the sake of clarity, but that one skilled in the art may employ any suitable electrical apparatus and wiring for the purposes of my invention. Also, transformers with associated condensers, etc. may be employed in place of batteries for the sources of power, since the electron tubes act as rectifiers. The power circuits will, of course, be adjusted to give a maximum desired electron emission in the different tubes under the worst atmospheric conditions and the desired maximum distance of the craft from the ground. Also, other features set forth in my prior application may be employed herewith.

The fundamental principles and the operation of the device will be apparent in view of the above disclosure. The aircraft guidance mechanism is governed and varied progressively in accordance with variations in the instantaneous angularity of a light sensitive element on the craft at the moment of its activation or de-activation by a light beam from a selected light source arranged in a definite relation to the airport runway. The guidance mechanism is preferably controlled by a variation in an electrical characteristic of a controlling circuit, such as the amperage or voltage of a direct or alternating current. The light sensitive element is initially located in such a position, or preferably so moved periodically across a given field of optical vision, that the element becomes activated by a selected light beam when the craft nears the airport. Thereafter, the element controls its own movement to and from an optically active position. This movement to and from a position where it can be activated and de-activated causes a similar but limited movement of a part which varies a characteristic in the electric circuit of the guidance or governed mechanism. The latter does not vary or oscillate as the phototube goes on and off, but it varies only with the progressively varying direction towards which the element must point to just pick up and lose the light. This is accomplished by the lost motion connection between the phototube oscillating shaft and the variable resistance. It is preferred to have two separate photo elements. One determines only the alignment of the craft with the runway center line, and for this purpose a row of lights at the runway is so located and shielded that their beams project upwardly only within a given angle, and the associated photo element is so shielded that it can pick up only light beams within that angle. Also, the altimeter lights are at a fixed distance from the runway center line and they are shielded so that the aircraft altimeter phototube must be located within that angle of light projection to be activated. This tube is so shielded that it cannot pick up light within a given angle, such as 30°, of a vertical plane and so cannot be activated by the alignment lights. Hence, my invention thus involves a definite relationship between the phototube angles of activation and the angles subtended by the two sets of projected light beams, and the altimeter instrument is so calibrated that it triangulates the light position relative to the craft as altitude when the craft is centered over the runway. Hence, in flight, the pilot first aligns the plane with the runway center, and thereafter he can determine his elevation above the runway even if he cannot see it. Thus a blind landing may be made safely.

Various modifications in this system and in the electrical and mechanical apparatus for operating it will now be readily apparent to one skilled in the art. Hence, the above disclosure is to be interpreted as illustrating the principles of this invention and a preferred embodiment thereof and not as imposing limitations on the claims appended hereto.

I claim:

1. Apparatus for aiding the landing of aircraft on a runway comprising a line of light extending in the direction of the runway and throughout the effective distance of approach, electronic apparatus on the craft having a light sensitive element, a shield which restricts the activation of the element to a unidirectional beam of light, a support providing for oscillative movement of the element and shield about an axis extending in the direction of flight to a position where the element may be activated by said light, mechanism governed by said electronic apparatus which causes the element to hunt said light and to be angularly directed for activation thereby, an indicating apparatus having an indicator and scale calibrated to provide an indication related to the directional angularity of the activated element, a power circuit for the indicating apparatus, and electrical means controlled by the electronic apparatus when the element is activated by said light which varies an electrical characteristic in said circuit and causes the indicator to move in response to a change in the directive angularity of the activated element.

2. Apparatus for aiding the landing of aircraft on a runway comprising two widely spaced parallel lines of light extending in the direction of the runway and throughout the effective distance of approach, two electronic devices having each a photoelectric element, a shield for each element restricting activation thereof to a unidirectional beam of light, a support providing for angular oscillation of each element and shield about a horizontal axis extending in the direction of flight, shields for the lights which permit one element to be activated only by one light and the other element only by the other light, mechanism governed by activation of each element which causes the element to hunt its associated light and be angularly directed towards the same, indicating apparatus having two movable indicators and scales calibrated to show the position of the craft and its altitude when the craft is vertically over the runway center line, a power circuit controlling each indicator, and means governed by the two electronic devices when the elements are activated which varies an electrical characteristic in the power circuit controlling each indicator in response to a variation in the directive angularity of the associated element and causes the indicators to translate said angularity as the relative location of the runway center line and the craft altitude.

3. Apparatus for aiding the landing of aircraft on a runway comprising a line of upwardly and laterally projected light spaced remotely from and parallel with the center line of the runway and extending throughout the effective distance of runway approach, a light sensitive element mounted on the aircraft for angular movement laterally of the direction of flight, a shield which limits the activation of the element to a unidirectional beam of light, means for moving the element laterally of the direction of flight and through a wide angle to a position where it is activated by the line of light, apparatus thereafter controlled by the activated element which maintains the element in an angular position close to one of light activation, an electrical indicator, a power circuit therefor, and means for varying an electrical characteristic in that circuit in response to the angular movement of the activated element so that said indicator responds to said movement and translates the angular position as altitude of the aircraft when it is flying in alignment with the center line of the runway.

4. Apparatus for aiding the landing of aircraft on a runway comprising a line of light extending in the direction of the runway center line and for the effective distance of aircraft approach, shields restricting the light to a definite vertical angle, electronic apparatus including a photosensitive element on the craft, a shield which limits activation of the element to a unidirectional beam of light, means including a device mounted for movement in a wide angle laterally of the direction of flight which causes the element to be activated momentarily when said light is angularly directed therefor, hunting mechanism for moving the device widely, means including an electrical circuit governed by the electronic apparatus which controls the hunting mechanism and maintains a substantially steady activation of the element, electrical apparatus including a power circuit, and means for varying an electrical characteristic in the power circuit in response to activation, said electrical apparatus indicating a function of the directive angularity of the activating light.

5. Apparatus according to claim 4 in which the hunting mechanism comprises an electrically operated device connected to move the element through a wide angle in one direction, a lost motion switch operated at the end of said wide angle movement to break the circuit to said device and means to return the element in the other direction to an electrically operated position.

6. Apparatus according to claim 4 in which the hunting mechanism comprises an electrically operated device controlled by light activation of the element which moves the element away from a position of light activation and means which acts after cessation of light activation to return the element to said position of activation.

7. Aircraft apparatus for aiding the landing of aircraft on a runway comprising a line of upwardly and laterally projected light extending in the direction of the runway and throughout the effective distance of runway approach, a phototube and an associated amplifier circuit on the craft, a shield which limits activation of the phototube to a unidirectional beam of light, mechanism operating independently of that circuit to oscillate the tube through a wide angle and laterally of the direction of flight so that it may be activated by the light, means controlled by said circuit after the phototube has been activated which limits the tube oscillation by said mechanism to a narrow angle, electrical apparatus in a power circuit, and means for varying an electrical characteristic in said power circuit in response to a variation in the angular direction of the phototube when activated so that said apparatus is governed in accordance with the position of the craft relative to said light.

8. Aircraft apparatus comprising a line of light extending in the same direction as a landing runway and for the effective distance of runway approach, a phototube and an associated amplifier circuit on the aircraft, a shield which limits activation of the tube to a unidirectional beam of light, means for moving the tube repeatedly through a wide angle laterally of the direction of flight to a position where it is ultimately activated by the light when the craft is flying thereover, mechanism controlled by said circuit after the phototube has been activated which causes the tube to oscillate angularly through a narrow angle into and away from a direction of light activation, independent electrical apparatus, a power circuit for actuating said apparatus, and means including a lost motion device for varying an electrical characteristic in said power circuit in a direct relation and in response to a variation in an end position of angularity of the oscillating phototube but which permits said narrow angle oscillation of the tube without varying said characteristic so that said electrical apparatus is governed in response to a change in the angularity of the activated phototube.

9. Apparatus according to claim 8 in which said means for varying an electrical characteristic comprises parts including a resistance and a contact arm arranged for relative movement to vary the amperage in said power circuit, one of said parts being mounted on the aircraft, and a gyroscopic device carrying the other part and holding it immovable relative to a horizontal plane as the aircraft tilts laterally in flight.

10. Apparatus for aiding the landing of aircraft on a runway comprising a line of upwardly and laterally projected light spaced remotely from and parallel with the runway center line and extending throughout the effective distance of runway approach and a second line of light, means governed by the second light which indicates when the aircraft is in alignment with the runway center line, an electronic circuit on the aircraft including a phototube mounted for oscillation laterally relative to the direction of flight, a shield which limits activation of the tube to a unidirectional beam of light, mechanism independent of said electronic circuit for oscillating the phototube through a wide angle until it is activated by said line of light when the aircraft is flying thereover, means governed by the electronic circuit after the phototube has been initially activated which controls said mechanism and causes the tube to be oscillated through a narrow angle into and away from an angular direction of light activation, an electrical altitude indicator, a power circuit therefor, means including a variable resistance in said power circuit which varies the current in response to a variation in directive angularity of the tube and causes the indicator to translate the angular direction of the activated phototube as altitude above the runway when the means governed by the second light shows that the aircraft is aligned with the runway center line, and shields limiting the lights to predetermined directions so that the tube will be activated only by said line of light irrespective of the craft position.

11. Apparatus for aiding the landing of aircraft on a runway comprising two fixed, widely spaced, parallel lines of light extending throughout the effective distance of the runway approach, one of which is in the plane of the runway center line and the other remote therefrom, two separate electronic circuits on the aircraft, each including a phototube and an amplifier, shields restricting the runway light to a narrow angle from a vertical plane and the remote light to a limited angle from a horizontal plane, shields for the phototubes so that one is activated only by the runway light and the other only by the remote light when the craft is flying thereover, separate means independent of the electronic circuits for moving each tube repeatedly through a wide angle laterally of the direction of flight until it is activated by its associated line of light, mechanism governed by each activated electronic circuit which controls said means and causes the associated phototube to move through a small angle into and away from a position of light activation, an alignment indicator and an altimeter arranged each in separate power circuits, means governed by the angular position of the phototube activated by the runway light which varies the current in the alignment indicator power circuit so that the indication is related to the position of the runway light relative to the aircraft, and means governed by the angular position of the other phototube when activated by the remote light for varying the current in the altimeter power circuit so that the altimeter indicates the altitude only when the alignment indicator shows that the aircraft is in alignment with the runway.

12. Apparatus for aiding the landing of aircraft on a runway comprising a line of light remote from the runway and extending parallel with the runway center line and which is spaced by a predetermined distance from said center line, shields for the line of light which restrict the angle of illumination to a vertical angle of less than 90° from a horizontal plane and which opens only towards the runway, electronic apparatus including a light sensitive element on the craft, a shield which limits activation of the element to a unidirectional beam of light, an angularly movable device for permitting a beam from said light line to activate the element, mechanism governed by the electronic apparatus when the element is activated which causes the device to be so directed as to maintain a substantially steady activation of the element as the light angularity changes when the craft approaches for landing on the runway, electrical altitude indicating apparatus including a power circuit, and means governed in accordance with the angular movement of the device which varies an electrical characteristic in said circuit and causes the apparatus to triangulate the directive angle of the activating light beam as altitude above the ground.

ROBERT J. HERBOLD.

REFERENCES CITED

The following references are of record in the file of this patent:

UNITED STATES PATENTS

| Number | Name | Date |
|---|---|---|
| 1,787,992 | McIlvaine | Jan. 6, 1931 |
| 1,864,638 | Chilowsky | June 28, 1932 |
| 2,070,178 | Pottenger Jr., et al. | Feb. 9, 1937 |
| 2,077,398 | Clark | Apr. 20, 1937 |
| 2,133,241 | Baker | Oct. 11, 1938 |
| 2,179,570 | Zublin | Nov. 14, 1939 |
| 2,196,139 | Carlson | Apr. 2, 1940 |
| 2,206,036 | Herson | July 2, 1940 |
| 2,216,716 | Withem | Oct. 1, 1940 |
| 2,245,246 | Alexanderson | June 10, 1941 |
| 2,297,534 | Brulin | Sept. 29, 1942 |
| 2,361,956 | Moseley | Nov. 7, 1944 |
| 2,366,939 | Smith et al. | Jan. 9, 1945 |

FOREIGN PATENTS

| Number | Country | Date |
|---|---|---|
| 501,963 | Germany | July 8, 1930 |
| 796,674 | France | Jan. 27, 1936 |